United States Patent [19]

Bennett et al.

[11] Patent Number: 4,540,384
[45] Date of Patent: Sep. 10, 1985

[54] TRIPOT JOINT WITH SPIDER RETAINING SHAFT BUMPER ASSEMBLY

[75] Inventors: Jack L. Bennett, Reese; Wayne E. Wardynski, Bay City; Kenneth J. Seyuin, Pinconning, all of Mich.

[73] Assignee: General Motors Corporation, Detroit, Mich.

[21] Appl. No.: 606,262

[22] Filed: May 2, 1984

[51] Int. Cl.³ .......................... F16D 3/20; F16D 3/30
[52] U.S. Cl. .................................. 464/111; 464/123; 464/905
[58] Field of Search ............... 403/310, 311, 326, 261; 464/111, 122, 146, 158, 905, 906, 123, 124

[56] References Cited

U.S. PATENT DOCUMENTS

| | | | |
|---|---|---|---|
| 1,650,573 | 11/1927 | Searles | 403/261 |
| 2,386,754 | 10/1945 | Snyder | |
| 3,287,934 | 11/1966 | Asher | 464/906 X |
| 3,613,396 | 10/1971 | Drevard et al. | 464/111 |
| 3,951,048 | 4/1976 | Bloom, Jr. et al. | 403/261 X |
| 4,027,927 | 6/1977 | Turner | 464/146 X |
| 4,083,202 | 4/1978 | Westercamp | 464/905 X |
| 4,288,172 | 9/1981 | Livesay et al. | 403/326 X |
| 4,318,282 | 3/1982 | Orain | 464/111 |
| 4,320,632 | 3/1982 | Dore | 464/111 |
| 4,472,160 | 9/1984 | Wright | 464/158 X |

FOREIGN PATENT DOCUMENTS

| | | | |
|---|---|---|---|
| 240129 | 11/1960 | Australia | |
| 2921352 | 12/1979 | Fed. Rep. of Germany | 403/326 |
| 1447078 | 8/1976 | United Kingdom | 464/146 |

Primary Examiner—Stuart S. Levy
Assistant Examiner—Daniel P. Stodola
Attorney, Agent, or Firm—Charles R. White

[57] ABSTRACT

Stroking type universal joint in which the spider assembly is trapped on the axle shaft by a two-part cylindrical connector sleeve of a bumper assembly which includes a resilient elastomer bumper secured on the end of the axle shaft by the sleeve that in turn is radially retained by a counterbore in the hub of the spider assembly.

3 Claims, 4 Drawing Figures

U.S. Patent  Sep. 10, 1985  4,540,384
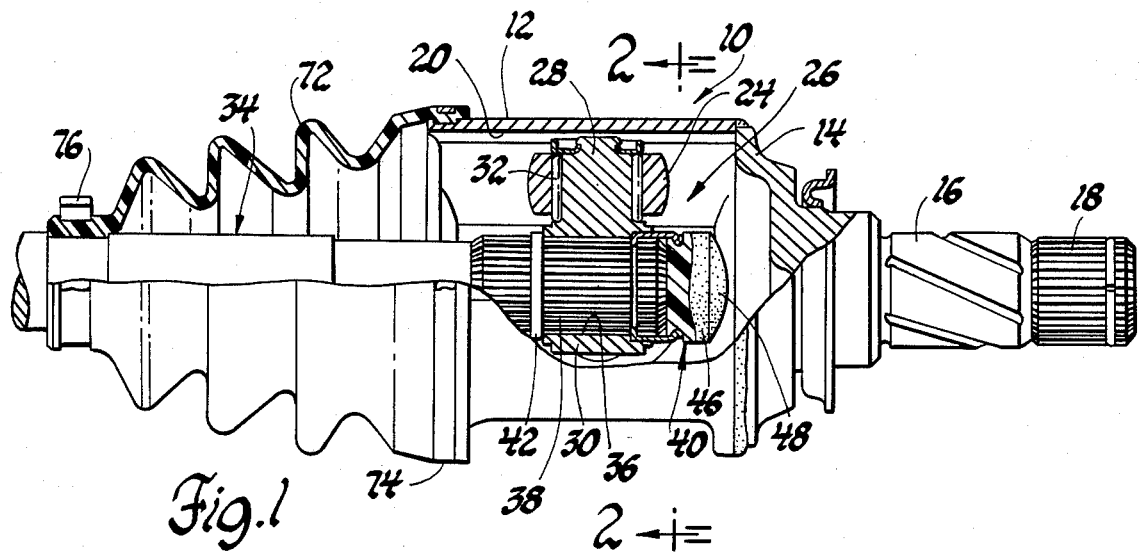
Fig.1
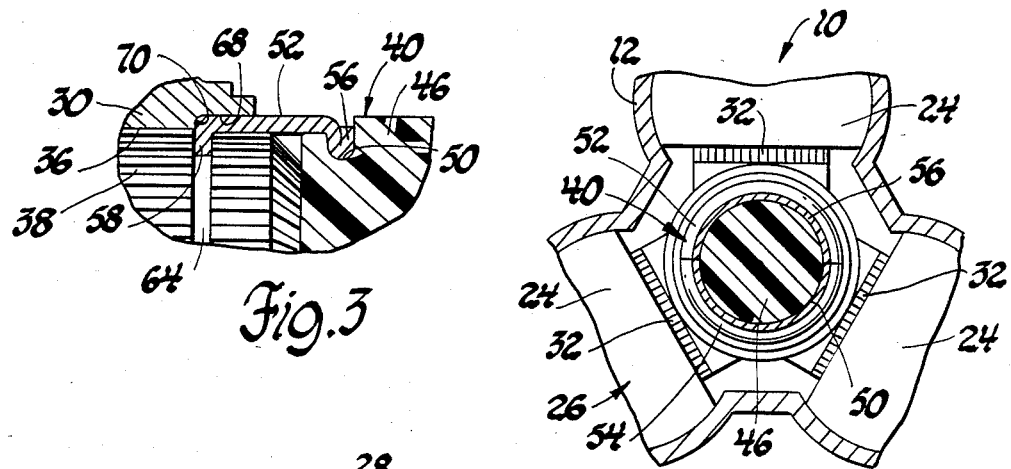
Fig.3
Fig.2
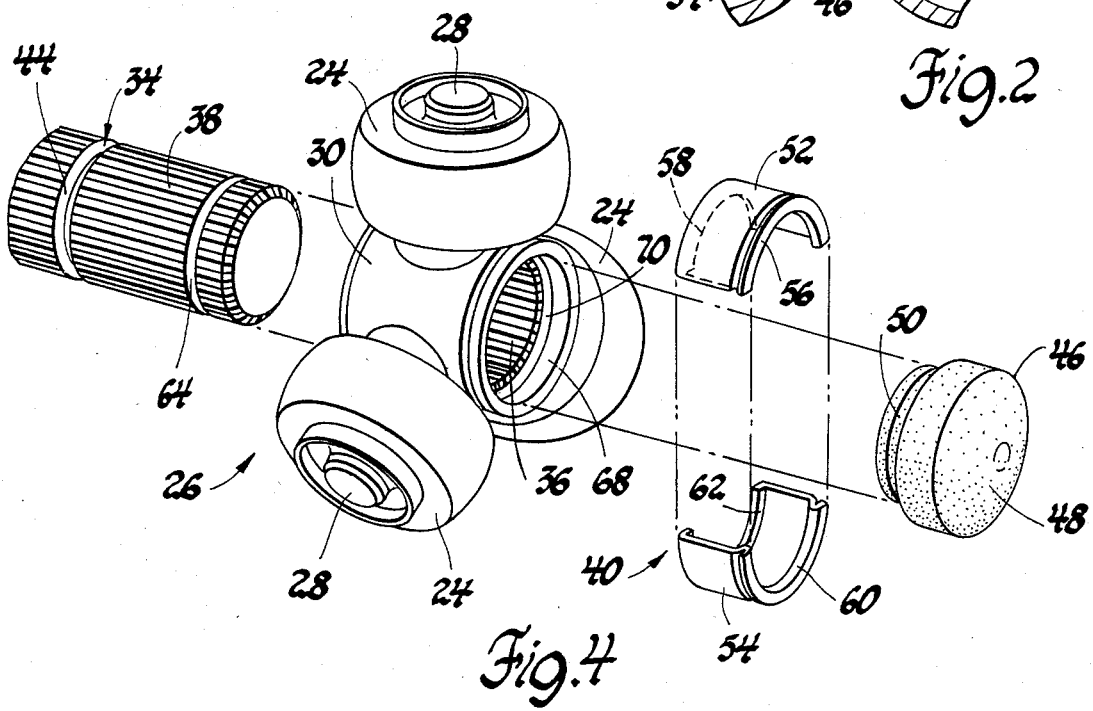
Fig.4

TRIPOT JOINT WITH SPIDER RETAINING SHAFT BUMPER ASSEMBLY

This invention relates to a new and improved tripot joint incorporating a bumper spring assembly that cushions stroking movement of the joint and retains the spider assembly on the end of the axle shaft of the joint. This invention also relates to a new and improved method of tripot joint assembly.

In the preferred embodiment of this invention there is a spider assembly of a tripot universal joint which is retained on the splined end of axle shaft by a new and improved bumper spring assembly which cushions and limits stroking movement of the axle shaft of the joint. The bumper spring of the assembly is a generally cylindrical pad of resilient plastics material which interfaces with the inboard end of the axle shaft and which is secured thereto by two semi-cylindrical metallic clamps that cooperates to form a cylindrical connector sleeve which peripherally fits around and grips the adjacent ends of the axle shaft and the elastomer pad to align and secure these components together. The two clamps and elastomer pad are initially held in position on the end of the shaft manually or by tooling. The spider assembly of the joint previously mounted on a splined end of the axle shaft is axially advanced on the axle shaft toward the pad until an axial counterbore in the end of the spider assembly encircles the two clamps to hold them together and form the connector sleeve. Each of these clamps have radially inwardly extending retainer lips at the ends thereof that fit into annular grooves in the axle shaft and elastomer pad thus locking the elastomer pad to the end of the axle shaft. In this position, the clamps form an end stop for the spider assembly by contacting the inboard shoulder thereof. A snap-type retaining ring or circlip is then installed into a locking groove in the axle shaft spaced from the inboard groove to contact the outboard shoulder of the spider assembly to complete the entrapment of spider assembly on the axle shaft. The axle shaft and the connected spider assembly are then inserted in a drive housing with the rollers of the spider assembly engaging drive channels in the drive housing. The universal joint is then closed by conventional boot seal construction.

It is a feature, object and advantage of this invention to provide a new and improved internally mounted spring assembly for the axle shaft of a tripot type universal joint which protects the joint from bottoming out in the housing in response to predetermined inward stroking of the joint and which retains the spider assembly on the axle shaft.

Another feature, object and advantage of this invention is to provide a new and improved tripot joint with a spider assembly retained on the axle shaft of the joint by a bumper spring assembly having cooperating retainer clamps encompassing the end of the axle shaft and the bumper.

It is another feature, object and advantage of this invention to provide a new and improved method of assembling and retaining a spider assembly onto the axle shaft of a tripot joint with a bumper spring assembly.

These and other features, objects and advantages of this invention will be more apparent from the following detailed description and drawing in which:

FIG. 1 is an elevational view partially sectioned of a universal joint of a drive axle assembly which incorporates the preferred embodiment of this invention.

FIG. 2 is a cross-sectional type view taken along lines 2—2 of FIG. 1 looking in the direction of the arrows.

FIG. 3 is an enlarged view of a fragment of the tripot joint of FIG. 1 showing the attachment of elastomer bumper to the end of the axle shaft of this joint.

FIG. 4 is an exploded view of the spider component of the tripot joint of FIGS. 1 and 2 illustrating its connection to the splined end of the axle shaft by the elastomer bumper assembly.

Referring now in greater detail to the drawing, FIG. 1 shows a portion of a vehicle drive axle including a stroking universal joint 10 of the tripot type having a three lobe drive housing 12. The drive housing 12 is closed as its inboard end by an end wall 14 and has a centralized drive shaft 16 integral therewith which extends axially therefrom to a terminal splined end 18 adapted to be connected to the side gear of a differential providing the output of an automatic or manual transmission, not shown.

The drive housing 12 is open at its outer end and has three equally spaced and longitudinally extending drive channels 20 formed by the internal walls of the lobes. These channels have partial spherical tracks that engage the outer surface of associated drive rollers 24 of a spider assembly 26. Each drive roller 24 is mounted on an associated one of three arcuately spaced trunnions 28 extending radially from a centralized hub 30 of the spide asembly. The rollers are mounted on the trunnions 28 with a full complement of needle bearings 32 interposed between the roller and the associated trunnion 28. These drive rollers are thus rotatable on the trunnions 28 and are slidable with respect thereto to allow the stroking pivotal movement of an elongated axle shaft 34 drivingly connected to the spider assembly as will be explained below.

The hub 30 of the spider assembly has internal splines 36 for drive connection with the externally splined inboard end portion 38 of the axle shaft 34 that extends through the open end of the drive housing 12. In accordance with this invention, the spider hub 30 is entrapped in the FIG. 1 position on drive shaft 34 between a bumper pad assembly 40 secured on the inboard end of the shaft and by a snap ring 42 which fits into an annular groove 44 formed in the splines of the inboard end portion of shaft 34.

In this invention, the bumper pad assembly 40 comprises a generally cylindrical bumper pad 46 of Hytrel or other suitable resilient plastics material which has a part spherical bumper surface 48 on the outer end thereof and an annular groove 50 formed in the periphery of the pad adjacent to the axle shaft end thereof. The bumper pad 46 is fitted against the end of shaft 34 and is retained in this position by two semi-cylindrical clamps 52 and 54 which may be thin-wall sheet metal members. These clamps are identical and each terminates in semi-circular and inwardly extending retainer segments 56, 58 and 60, 62 that are employed for securement of the bumper pad 46 to the end of the axle shaft 34 and to secure the spider assembly in axial position on the splined end of the shaft. To this end, the clamps 52, 54 are brought into position encircling the end of the bumper pad and the end of the shaft 34. In this position, the retainer segments 56 and 60 of clamps 52 and 54 engage groove 50 of the bumper pad while retainer segments 58 and 62 of these clamps engage and annular groove 64 cut in the splined end portion 38 of shaft 34 adjacent to the end thereof. With the clamps 52 and 54 manually or otherwise held the spider assembly 26 preinstalled in the shaft 34 is moved axially toward the free end of the shaft to the FIG. 3 position. In this position, the counterbore 68 of the spider assembly closely fits over the outer periphery of the two clamps to hold them in face-to-face clamping engagement to complete the cylindrical connector sleeve. The inner radial wall 70 of the bore 68 engages radial walls of retainer segments 58 and 62 of the clamps to limit the axial movement of the spider assembly to a position closely adjacent to the end of the shaft. After this, snap ring 42 is installed in the outboard retainer groove 44 to capture the hub of the spider assembly in fixed axial position on the shaft.

With the spider assembly secured in position and with bumper pad assembly mounted to the end of shaft 34, stroking movement of the shaft in any angular position will be effectively cushioned by deflection of the resilient pad on contact with internal surfaces of housing 12 or end wall 14.

The outboard end universal joint 10 is sealed by a convoluted elastomer boot seal 72 having its enlarged end secured by clamp 74 to the outer periphery metal of the housing. The inboard end of the boot seal is secured by a clamp 76 to the drive shaft 34.

The above invention should not be limited to particular details of the construction shown and described. This specification has obvious modifications and will occur to a person skilled in the art.

The embodiments of the invention in which an exclusive property or privilege is claimed are defined as follows:

1. A universal joint having a centralized inner drive shaft terminating in an externally splined end portion and an end face, a retainer groove formed in said splined end portion adjacent to said end face, a spider assembly having a hub drivingly mounted on said splined end portion adjacent to said end face, said hub having recess means therein spaced outwardly from the outer periphery of said splined end portion, said hub further having a plurality of radially extending drive elements operatively mounted thereon, an outer housing disposed around said drive elements, a plurality of arcuately spaced drive channels formed in said housing, said drive elements being operatively mounted in said drive channels so that said drive shaft can be pivoted and linearly moved within said housing, the improvement comprising a bumper assembly for said inner drive shaft, said bumper assembly including a bumper pad of resilient material adapted to be secured to the end of said drive shaft and a pair of curved clamps, said bumper pad having a retainer groove formed in the periphery thereof, each of said clamps having inwardly extending retainer portions at opposite ends thereof respectively received in the retainer grooves in the end of said shaft and in said bumper pad to secure said bumper pad adjacent to the end face of said drive shaft, said recess means of said hub providing radial wall means to peripherally contact said curved clamps to secure said clamps to the end portion of said drive shaft.

2. A universal joint having a rotatable centralized inner drive shaft terminating in an externally splined end portion and an end face, retainer groove means formed in said splined end portion, a spider assembly having a hub drivingly mounted on said splined end portion adjacent to said end face, said hub having recess means therein providing wall means spaced outwardly from the outer periphery of said splined end portion and said retainer groove means, said hub further having a plurality of radially extending drive elements operatively mounted thereon, a shell-like outer drive housing disposed around said drive elements, a plurality of arcuately spaced drive channels formed in said housing, said drive elements being operatively mounted in said drive channels so that said drive shaft can be pivoted and linearly moved within said housing, the improvement comprising a bumper assembly for said shaft, said bumper assembly including a bumper pad of resilient plastic material adapted to be secured to the end of said drive shaft and against the end face thereof, said pad having retainer groove means therein, and a pair of thin-walled and curved clamps, each of said clamps having inwardly extending retainer portions at opposite ends thereof received in said retainer groove means in the ends of said shaft and said bumper pad to secure said bumper pad adjacent to the end face of said drive shaft and to block said hub from movement off of the splined end portion of said shaft, said wall means of said hub being operative to fit over a portion of said clamps to secure said clamps to the end portion of said drive shaft.

3. A universal joint having a centralized inner drive shaft terminating in an externally splined end portion and an end face generally transverse to the axis of said drive shaft, a spider assembly having an internally splined hub drivingly mounted on said splined end portion of said drive shaft adjacent to said end face, retainer groove means in said splined end portion, said hub having a recess therein forming annular wall means therein spaced outwardly from the outer periphery of splined end portion of said drive shaft, said hub further having a plurality of radially extending drive elements operatively mounted thereon, a shell-like outer housing disposed around said drive elements, a plurality of arcuately spaced drive channels formed by said housing, said drive elements being operatively mounted in said drive channels so that said drive shaft can be pivoted and linearly moved within said housing, the improvement comprising a bumper assembly for said shaft, said bumper assembly including a bumper pad of resilient plastic material adapted to be secured adjacent to the end of said drive shaft and a pair of thin-walled part cylindrical clamps, said bumper pad having retainer groove means formed in the periphery thereof said clamps having inwardly extending arcuate retainers at opposite ends thereof respectively received in said retainer groove means in the end portion of said shaft and said bumper pad to secure said bumper pad adjacent to the end face of said drive shaft and to limit movement of said hub off of said splined end portion of drive shaft, said annular wall means of said hub being operative to fit over and contact a portion of said clamps to secure said clamps to said end portion of said drive shaft and thereby said bumper pad to said drive shaft and retainer means associated with said drive shaft and said hub to block movement of said hub on said splined end portion away from said bumper pad.

* * * * *